June 9, 1953   W. F. GEARIEN   2,641,078
FISH LANDING FUNNEL
Filed Nov. 30, 1951
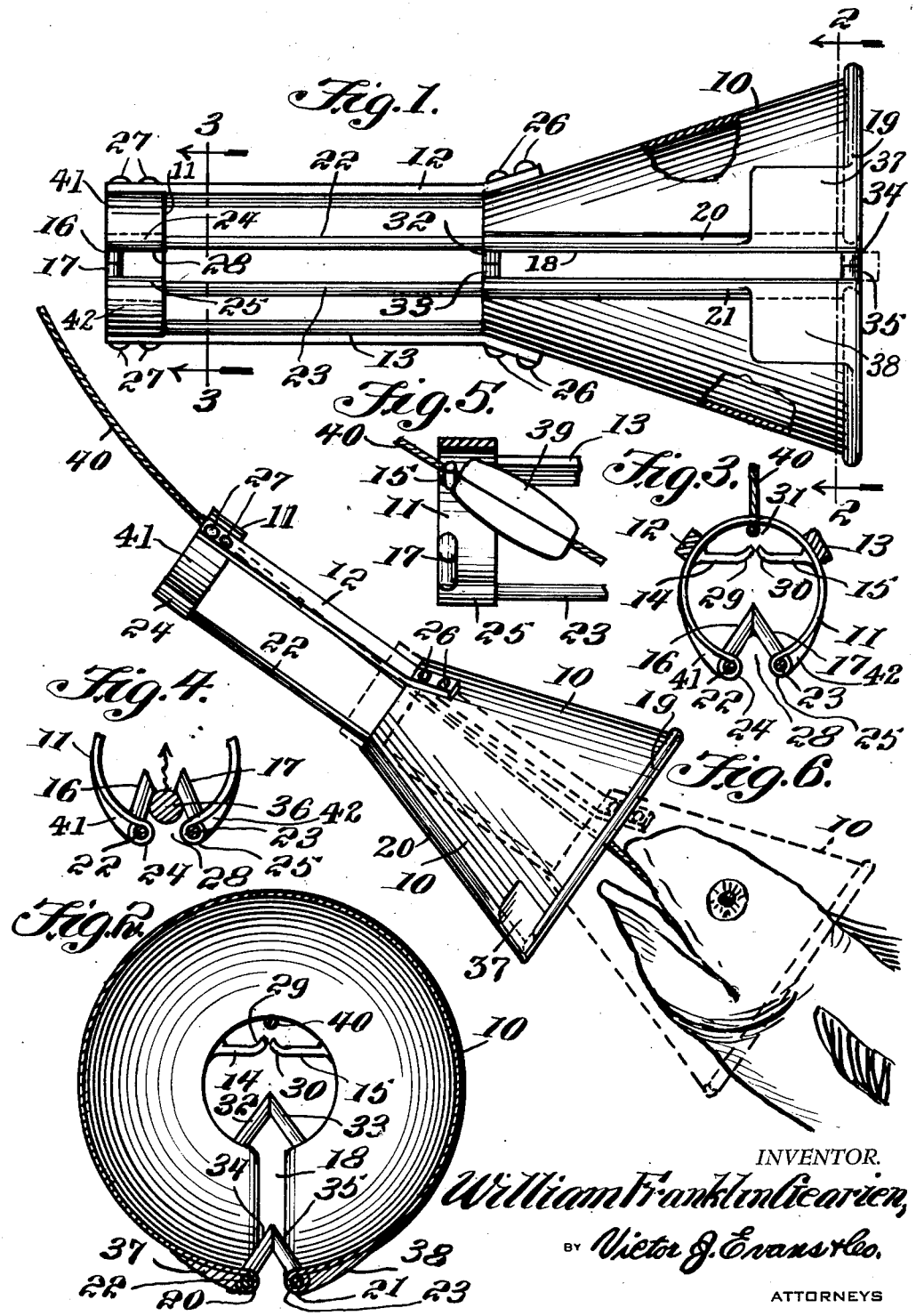
INVENTOR.
William Franklin Gearien,
BY Victor J. Evans & Co.
ATTORNEYS Patented June 9, 1953

2,641,078

UNITED STATES PATENT OFFICE 2,641,078

FISH LANDING FUNNEL

William F. Gearien, Hamilton, Ill.

Application November 30, 1951, Serial No. 259,083

1 Claim. (Cl. 43—5)

This invention relates to fishing tackle and particularly devices used on fishing lines and in combination with fish hooks for securing fish on hooks, and in particular this invention includes a funnel slidably mounted on a fishing line and adapted to slide downwardly on the line with the funnel passing over the head of a fish caught on a hook of the line whereby the mouth of the fish is wedged in a closed position with the hook therein.

The purpose of this invention is to facilitate securing fish on hooks of fishing lines by enclosing the head of the fish in a shield or guard which prevents the fish shaking the hook from his mouth.

Various types of devices have been provided for securing fish on fish hooks, however, these devices are attached to or formed in combination with the hook and whereas they make it difficult for the fish to shake the hook from his mouth they also makes it difficult for the fish to strike the hook. With this thought in mind this invention contemplates an auxiliary device detached from the hook and slidably mounted on the fishing line whereby after the fish has taken the hook the device slides downwardly over the head of the fish clamping the jaws of the fish together and thereby, making it substantially impossible to remove the hook from the mouth of the fish until the device is removed.

The object of this invention is, therefore, to provide a funnel like shield and means for attaching the shield to a fishing line whereby the device may travel downwardly on the line and extend over the head of a fish held on a hook of the line.

Another object of the invention is to provide a device for securing a fish on a fishing line that is adapted to be applied to conventional fishing lines without changing parts of the line.

A further object of the invention is to provide a funnel like shield for securing a fish on a hook of a fishing line in which the shield is of a comparatively simple and economical construction.

With these and other objects and advantages in view the invention embodies a funnel having a cylindrical ring extended from the small end thereof with a continuous slot extended through the funnel and ring and with means for retaining a fishing line in the device with the device freely slidable on the line and adapted to be retained thereon by a sinker on the end of the line.

Other features and advantages of the invention will appear from the following description taken in connection with the drawings, wherein:

Figure 1 is a view looking upwardly toward the under side of the funnel showing the slot extended therethrough and in which parts of the funnel are broken away to show the structure thereof.

Figure 2 is a cross section through the outer end of the funnel taken on line 2—2 of Figure 1.

Figure 3 is a cross section through the cylindrical section extended from the funnel taken on line 3—3 of Figure 1.

Figure 4 is a detailed fragmentary section similar to Fig. 3 illustrating flexible fingers mounted in the funnel and positioned to extend over the slots extended therethrough whereby the device may be placed over a fishing rod.

Figure 5 is a detail illustrating the fingers in the small part of the funnel and showing a sinker in engagement with the fingers whereby the sinker provides a stop limiting outward movement of the funnel on the line to prevent losing the funnel.

Figure 6 is an elevational view illustrating the action of the funnel traveling downwardly on a fishing line wherein the funnel is shown in full line and also showing the position of the funnel with the funnel over the head of a fish, the funnel being shown in dotted line in this position.

Referring now to the drawings wherein like reference characters denote corresponding parts, the fish landing funnel of this invention includes a frustro-conical shaped section forming a funnel 10, a cylindrical section 11 providing a band spaced from the funnel and secured thereto by arms 12 and 13, fingers 14 and 15 extended into the band 11 and resilient fingers 16 and 17 extended inwardly over a continuous slot 18 that extends through the funnel.

The funnel 10 is formed with a rim 19 around the large end and the edges on the sides of the slot 18 are rolled to form beads 20 and 21.

Rods 22 and 23 are secured in the beads 20 and 21, respectively and, as shown in Figure 1 these rods extend to support the cylindrical band 11 with the ends of the rods secured in beads 24 and 25 rolled on the ends of the band.

The ring 11 is supported by the arms or bars 12 and 13 one of the ends of which are secured to the funnel 10 with rivets 26 and the opposite ends of which are secured to the band with rivets 27 and, as illustrated in Figure 3, the band which is provided with a slot 28, in the lower side is positioned with the slot aligned with the slot 18 of the funnel 10 and with the fingers 14 and 15 in the upper part thereof.

The fingers 14 and 15 are provided with spaced arcuate extended ends 29 and 30, respectively and a fishing line extended through the funnel works between the ends of the fingers and into an area 31 in the upper part of the device.

The slots 18 and 28 are closed at the ends with resilient tubular fingers 16 and 17, and the band 11, 32 and 33 in the small end of the funnel and 34 and 35 at the large end thereof. With these fingers positioned in this manner a funnel may be placed over a fishing rod, as indicated by the numeral 36, and shown in Figure 4, and after the rod passes the spring fingers the device is securely held thereon.

Upon a fish striking a line the funnel is started down the line and as it approaches the fish the funnel passes over the head of the fish with the funnel reaching the position shown in dotted lines in Figure 6.

The lower side of the funnel is reinforced with sections 37 and 38 and the band 11 is reinforced with sections 41 and 42. These sections provide weights to retain the funnel with the resilient fingers in the lower part and the fingers 14 and 15 in the upper part.

Should the fish escape from the hook before the funnel arrives at the part of the line on which the hooks are positioned a sinker, as indicated by the numeral 39 engages the fingers 14 and 15 to prevent the funnel passing over the hook on the end of the line.

It will be understood that other means may be provided for preventing the fishing line, which is indicated by the numeral 40 passing through the funnel or for preventing the funnel being accidently separated from the line.

It will be understood that modifications may be made in the design and arrangement of the parts without departing from the spirit of the invention.

What is claimed is:

In a fish landing funnel, the combination which comprises a frusto conical shaped body, a ring spaced from the small end of the body, arms extending from the body and attached to the ring to space the ring from the body, said body and ring having aligned slots in one of the sides thereof, resilient fingers with meeting extended ends carried by the body and ring and extending over the slot thereof, fingers with spaced extended ends extending from the inner surface of the ring and guide rods corresponding with the edges of the slots extending from the body to the ring.

WILLIAM F. GEARIEN.

References Cited in the file of this patent

UNITED STATES PATENTS

| Number | Name | Date |
|---|---|---|
| 878,362 | Denning | Feb. 4, 1908 |
| 987,522 | Williams | Mar. 21, 1911 |
| 2,235,371 | Jyrkas | Mar. 18, 1941 |
| 2,464,715 | Peterson | Mar. 15, 1946 |
| 2,479,448 | Woock | Aug. 16, 1949 |

FOREIGN PATENTS

| Number | Country | Date |
|---|---|---|
| 60,401 | Norway | Jan. 30, 1939 |